United States Patent [19]

Wilson et al.

[11] 3,909,691

[45] Sept. 30, 1975

[54] DIRECTION INDICATING DISPLAY SYSTEM

[75] Inventors: Robert Morris Wilson, Vineland; William John Bachman, Moorestown, both of N.J.

[73] Assignee: RCA Corporation, New York, N.Y.

[22] Filed: Oct. 9, 1973

[21] Appl. No.: 404,781

[30] Foreign Application Priority Data

Jan. 29, 1973 United Kingdom............... 04322/73

[52] U.S. Cl.............. 318/490; 318/673; 200/11 DA

[51] Int. Cl.$^{2}$........................................ G05B 11/14

[58] Field of Search.................... 318/490, 595, 673; 343/760; 340/282; 200/24, 110 A

[56] References Cited

UNITED STATES PATENTS

| | | | |
|---|---|---|---|
| 2,616,994 | 11/1952 | Luhn | 200/11 DA |
| 2,659,075 | 11/1953 | Collins et al. | 343/760 X |
| 2,701,353 | 2/1955 | Van Sickle | 340/282 X |
| 2,911,636 | 11/1959 | Brouse | 340/282 X |
| 3,177,309 | 4/1965 | Amstutz | 200/24 X |
| 3,471,760 | 10/1969 | Dicke | 318/490 X |

*Primary Examiner*—B. Dobeck

*Attorney, Agent, or Firm*—Edward J. Norton; Robert L. Troike

[57] ABSTRACT

A direction indicating display for a rotator assembly is achieved by four lights with each light indicating one of the four compass directions of north, south, east and west and by control of the current through these lights using diode rectifiers, spaced conductive strips and rotating contactors.

7 Claims, 9 Drawing Figures

DIRECTION INDICATING DISPLAY SYSTEM

BACKGROUND OF THE INVENTION

This invention relates to rotator assemblies and more particularly to an inexpensive display system for remotely indicating the rotated position of a structure, for example, an antenna mounted to a rotator assembly.

Home television reception antennas are usually directional, and rotators are widely used in areas where television broadcasts are from different azimuth directions relative to the directional antennas. Home television antenna rotators are also useful where it is desirable to position the antenna in azimuth for other reasons such as "ghosts" in the received television picture. Since these antennas may be placed where they are difficult to view, for example, on the roof of a dwelling, in the attic of the dwelling or within an enclosure, it is desirable to provide some means by which the pointing direction of the antenna is known to ensure that the antenna is receiving the maximum desired signal. Although a precise location indication such as one within 6° can be provided by antenna rotators now available, these rotators are relatively costly. Often the user does not require such a precise location indication, since the user views the quality of the picture on the television set to determine the optimum antenna pointing direction. However, the user still must have a general indication of his antenna pointing direction. Having determined the general pointing direction of the antenna, the user can then optimize the antenna pointing direction by observing the quality of the picture on his television screen. There is, therefore, a need for a low cost indicator system which can generally indicate the position of a structure such as an antenna driven by a rotator assembly.

BRIEF DESCRIPTION OF INVENTION

An improved indicating display adaptable for use with the driver of a rotator assembly is provided which includes a plurality of conductive strips, direction indicator lights, and at least one movable contactor. The conductive strips are spaced in an insulating manner from each other. Each strip is coupled to a different one or more of the indicator lights at one terminal or end thereof. The opposite end or terminal of each light is coupled to a source of potential. The movable contactor is coupled to a second source of potential and is adapted, when moved, to make electrical contact with the conductive strips. The movable contactor is mechanically coupled to the driver of the rotator assembly for moving the contactor to engage the strips in synchronism with the movement of the rotator assembly. When the contactor touches one of the strips, the difference in potential of the first and second sources of potential causes at least one of the lights connected to the contacted strip to be illuminated, indicating the position of the rotator assembly.

DETAILED DESCRIPTION OF INVENTION

A more detailed description follows in conjunction with the following drawings wherein.

Figure 1:
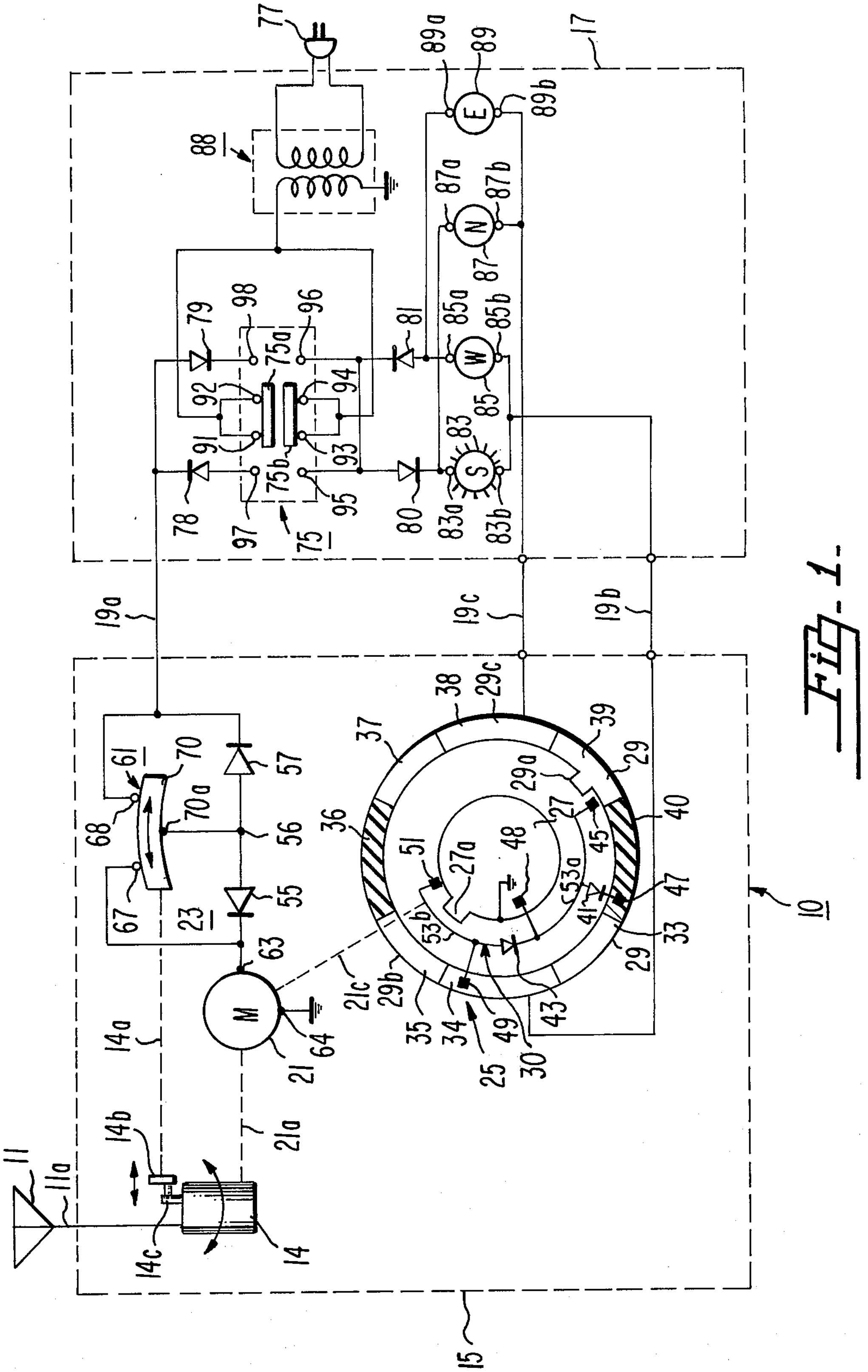
FIG. 1 is a schematic diagram of an antenna rotator assembly including a direction indicator system according to one embodiment of the invention.

Referring to FIG. 1, a rotator assembly 10 is mechanically coupled to an antenna 11 (top left). The antenna 11 for example, a television antenna, is mounted by a suitable shaft 11*a* to a rotatable member 14 in a drive unit 15. The rotator assembly 10 includes the drive unit 15, a control unit 17 and three wires 19*a*, 19*b* and 19*c* between the control unit 17 and the drive unit 15. The rotatable member 14 is free to rotate 360° in either the clockwise or counterclockwise direction in azimuth to an end-stop position in the drive unit 15. The drive unit 15 along with the rotatable member 14 can be located at a remote place such as the roof top of a dwelling, an attic, etc. The control unit 17 is placed conveniently for the operator such as on top of a television set.

The drive unit 15 includes a drive motor 21, a cam driven end-stop control system 23, a commutator system 25, the rotatable member 14, a movable end-stop arm 14*b* and mechanical linkages 14*a*, 21*a* and 21*c* (indicated by long dashed lines). The drive motor 21 is coupled by mechanical linkage 21*a* to the rotatable member 14. When the drive motor 21 turns in either a clockwise or counterclockwise direction, a corresponding rotation of the antenna 11 takes place via rotatable member 14. The rotatable member 14 is coupled via movable end-stop arm 14*b* and linkage 14*a* to end-stop control system 23. The drive motor 21 is coupled via linkaage 21*c* to commutator system 25.

The end-stop control system 23 includes a pair of diodes 55 and 57 and a cam operated three position switch 61. A first terminal 63 of drive motor 21 is coupled to the cathode of diode 55 and to the first terminal 67 of switch 61. The opposite terminal 64 of motor 21 is connected to ground potential. Wire 19*a* to the control unit 17 is connected at the drive unit 15 to the cathode of diode 57 and to the terminal 68 of switch 61. The three position switch 61 has a third terminal 70*a* at a movable arc-shaped contactor arm 70 connected to the anode of diodes 55 and 57 at junction 56. The movable arc-shaped contactor arm 70 makes simultaneous contact with terminals 67 and 68 in a first centered position and contacts only terminal 67 or terminal 68 in the other two positions. The contactor arm 70 is mechanically linked via mechanical linkage 14*a* and end-stop arm 14*b* to the rotatable member 14 so that when the rotator points the antenna in the south position, an extended portion 14*c* of rotatable member 14 drives end-stop arm 14*b* and consequently contactor arm 70 a short distance in one direction or the other. When the rotatable member 14 is rotated in the maximum clockwise direction so that portion 14*c* drives end-stop arm 14*b*, contactor arm 70 is driven to the right in FIG. 1 so as to open the connection between terminal 67 and arm 70. When the rotatable member 14 of drive unit 15 has been rotated by motor 21 via linkage 21*a* 360° to cause the extended portion 14*c* to move the end-stop arm 14*b* in the counterclockwise direction, the cm tactor arm 70 is driven to the left in FIG. 1, and the connection between contactor arm 70 and terminal 68 is opened. When the extended portion 14*c* of rotatable member 14 is not touching the end-stop arm 14*b*, the contactor arm 70 connects terminal 67 and 68 to each other and the diodes 55 and 57 are bypassed connecting terminal 63 of motor 21 to the drive unit end of wire 19*a*. When contactor arm 70 is driven to the left via linkage 14*a* and end-stop arm 14*b*, diode 55 only is bypassed and current will flow in only one direction through diode 57 and permit only clockwise rotation thereafter of the drive motor 21. Similarly, when arm 70 is driven to the right via linkage 14*a* and end-stop arm 14*b*, diode 57 is bypassed and current will flow in only one direction through diode 55 and permit only counterclockwise rotation thereafter of the drive motor 21. The commutator system 25 will be described later in connection with the indicator system portion of the rotator system 10.

The control unit 17 includes a three position double throw switch 75, four diodes 78, 79, 80 and 81, four indicator lights 83, 85, 87 and 89 and a transformer 88. The switch 75 has eight terminals 91 through 98. The terminals 91, 92, 93 and 94 are coupled at the secondary of transformer 88 to an alternating current (ac) source of potential. The primary of the transformer 88 is coupled via plug 77 to a standard 115 volt 60 cps source. The terminal 95 is connected to the anode of diode 80 and to the cathode of diode 81. The terminal 96 is connected to the anode of diode 80 and to the cathode of diode 81. Terminals 95 and 96 and diodes 80 and 81 are associated with the indicator system described in more detail in subsequent paragraphs. Terminal 97 of switch 75 is coupled to anode terminal of diode 78, and terminal 98 is coupled to the cathode terminal of diode 79. The cathode of diode 78 and the anode of diode 79 are connected to wire 19*a* at the drive unit 15. The switch 75 includes a pair of conductive bars 75*a* and 75*b*. When the conductive bars 75*a* and 75*b* are in the centered position, terminals 91 and 92 are connected to each other and terminals 93 and 94 are connected to each other. In this condition, no ac current from the transformer 88 flows from the switch 75. When the switch 75 is activated in one direction such that the bar 75*a* makes contact between terminals 91 and 97 and bar 75*b* makes contact between terminals 93 and 95 current flows in only one direction through diode 78 to drive unit 15. Also ac voltage is applied to diodes 80 and 81. When the switch 75 is activated in the opposite direction such that the bar 75*a* makes contact between terminals 92 and 98 and bar 75*b* makes contact between terminals 94 and 96 current flows in an opposite direction through diode 79 and ac voltage is applied to diodes 80 and 81.

In the operation of the rotator assembly 10, the switch 75 is positioned such that the bars 75*a* and 75*b* are in contact with terminals 97 and 95, respectively, to cause rotation of the antenna 11 in a first direction such as counterclockwise or with the bars 75*a* and 75*b* in contact with terminals 98 and 96, respectively, to cause rotation of the antenna 11 in a second or clockwise direction. In the centered position, no rotation occurs. When bars 75*a* and 75*b* provide contact between terminals 91 and 97 and between terminals 93 and 95, only that portion of the ac signal which is above ground potential is coupled through diode 78, wire 19*a*, terminals 67 and 68 of end-stop system 23 and motor 21 to ground potential. Current in this direction through motor 21 causes, in the example, counterclockwise rotation of the drive motor 21 and counterclockwise rotation of the antenna 11 via rotatable member 14. When the drive motor 21 causes the rotatable member 14 to reach its maximum counterclockwise position, the portion 14*c* via the mechanical linkage 14a and end-stop arm 14*b* drives contactor arm 70 away from terminal 68. Because of the reverse biased diode 57, no current flows through the motor 21 and the motor 21 stops.

If the bars 75*a* and 75*b* of switch 75 are then moved to provide contact between terminals 92 and 98 and between terminals 94 and 96, only that portion of the ac signal from the source which is below ground potential is coupled through diode 79, wire 19*a*, terminal 67 of end-stop system 23 and motor 21. In this condition, the diode 57 is forward biased and current flows in the opposite direction and causes clockwise rotation of the antenna 11 via rotatable member 14. When the drive motor 21 causes the rotatable member 14 to rotate about 360° from the maximum counterclockwise position, the portion 14*c* via the mechanical linkage 14*a* and end-stop arm 14*b* drives contactor arm 70 away from terminal 67. Because of reverse biased diode 55, no current flows through the motor 21 and it stops and permits only rotation of the motor when switched back to the counterclockwise position.

An indication of the rotated position and hence the pointing direction of the antenna 11 is provided by indicator lights 83, 85, 87 and 89 in the control unit 17. The light 83 only is illuminated to indicate the antenna pointing for maximum response in the south compass direction. Similarly, lights 85, 87 and 89 are each illuminated alone to indicate the antenna 11 pointing for maximum response in the west, north and east directions respectively. When two lights are illuminated, the antenna is pointing in a direction somewhere between the two compass directions indicated by the lights. The system is arranged so that all four lights are illuminated when the end-stop position is reached. This indicator system for the antenna rotator assembly 10 includes the commutator system 25 located in the drive unit 15, the indicator lights 83, 85, 87 and 89 and the switch 75 located in the control unit 17, and the wires 19*b* and 19*c* coupled between the drive unit 15 and control unit 17.

The commutator system 25 includes a fixed inner conductive member 27, a fixed coaxial outer commutator ring 29 and a rotatable contactor assembly 30. The fixed inner commutator member 27 is a circular disk of conductor material having a portion 27*a* extending radially at one point along the rim of member 27. The inner commutator member 27 is electrically connected to ground potential. The fixed outer commutator ring 29 includes eight sectors 33 through 40, where each sector covers an arc of 45°. As shown in FIG. 1, the third sector 35 is aligned with the extended portion 27*a* of the inner commutator member 27. The fourth and eighth 45° sectors 36 and 40 are of insulator material, and the first through the third sectors 33, 34 and 35 are of continuous conductive material. The fifth through the seventh sectors 37 through 39 are also of continuous conductive material. In construction, the commutator ring comprises two conductive strips 29*b* and 29*c* with each strip 135° of arc and with one strip 29*b* containing sectors 33, 34 and 35 and the other strip 29*c* containing sectors 37, 38 and 39. These two strips are separated by the two insulated sectors 36 and 40 each 45° of arc. A portion 29*a* of commutator ring 29 extends toward member 27 at the middle of sector 39. The inner commutator member 27 and the outer commutator ring 29 may be provided by a dielectric board having on one surface a conductive disk at the center to provide the commutator member 27 and two 135° conductive strips 29*b* and 29*c* to provide the commutator ring 29. The conductive strips 29*b* and 29*c* are arranged in a circle coaxial with the center member 27 and with a 45° insulative segment (sectors 36 and 40) separating the conductive strips 29*b* and 29*c* at opposite ends of these strips.

The rotatable contactor assembly 30 includes a pair of diodes 41 and 43, five contactors 45, 47, 48, 49 and 51, and two conductive arc-shaped spacing members 53*a* and 53*b*. The conductive spacing members 53*a* and 53*b* are coupled together in series with diode 43. The arc-shaped members 53*a* and 53*b* together with the diode 43 form a rigid semicircular structure. Contactor 45 extends from one end of member 53*a* of this semicircular ring-like structure, and contactor 51 extends from member 53*b* at the opposite end of the semicircular structure. Contactor 51 is adapted to make contact only with the extended portion 27*a* of commutator member 27, and contactor 45 is adapted to make contact only with the extended portion 29*a* of commutator ring 29. Contactors 45 and 51 are separated from each other by 180° of arc by members 53*a* and 53*b* and diode 43. Contactor 48 is connected at one end to the arc-shaped member 53*a* at a point midway between contactors 45 and 51. Contactor member 48 is arranged to provide continuous contact with commutator member 27 even when the rotatable contactor assembly 30 is rotated. Contactor 47 is connected to and extends from arc-shaped member 53*a* midway between the connection point of contactor 48 and contactor 45. Contactor 47 is connected to member 53*a* via diode 41. The anode of diode 41 is connected to member 53*a* and the cathode of diode 41 is connected to contactor 47. Contactor 49 is connected to member 53*b* at a point midway between the connecting point of contactor 48 to member 53*a* and the connecting point of contactor 51 to member 53*b*. In terms of degrees of arc between contactors, contactor 47 is 45° of arc from contactor 45, contactor 48 is 45° of arc from contactor 47, contactor 49 is 45° of arc from contactor 48, and contactor 51 is 45° of arc from contactor 49. Contactors 47 and 49 are 90° of arc from each other. The whole contactor assembly 30 rotates about the commutator member 27 between the member 27 and the commutator ring 29 with the contactors 47 and 49 always traveling along the ring 29, contactor 48 in contact with member 27, contactor 45 making contact with extended portion 29*a* when rotated to the center of sector 39, and contactor 51 making contact with extended portion 27*a* when rotated to the center of sector 35. The assembly 30 is driven by the drive motor via mechanical linkage 21 *c* (indicated by long dashed lines) in synchronization with the antenna rotation. When clockwise rotation of the rotatable member 14 occurs, clockwise rotation of the assembly 30 occurs. Similarly, when counterclockwise rotation of rotatable member 14 takes place, counterclockwise rotation of the assembly takes place. In the illustrated example, one revolution of the rotatable member 14 causes one revolution of the assembly 30.

At the control unit 17 are the indicator lights 83, 85, 87 and 89. South indicating light 83 and north indicating light 87 are connected at terminals 83*a* and 87*a* respectively to the cathode of diode 80. West indicating light 85 and east indicating light 89 are coupled at terminals 85*a* and 89*a* to the anode terminal of diode 81. The opposite terminals 83*b* and 85*b* of lights 83 and 85 respectively are coupled by wire 19*b* to sector 34 of conductive strip 29*b* of drive unit 15. Sectors 33 thru 35 of commutator ring 29 are electrically connected to each other and form strip 29*b*. The opposite terminals 87*b* and 89*b* of lights 87 and 89 respectively are connected by wire 19*c* to sector 38 of conductive strip 29*c* of drive unit 15. Sectors 37 thru 39 of commutator ring 29 are electrically connected to each other and form strip 29*c*.

In the operation of the indicator system, the lights 83, 85, 87 and 89 show the rotated position of the antenna 11. When the bar 75*b* of switch 75 provides contact either between terminals 93 and 95 of switch 75 or between terminals 94 and 96, directional current is coupled through either diode 80 or 81. Diode 80 couples current in a first direction through lights 83 and 87 when the phase of the ac source provides a potential above ground potential. Diode 81 couples the current in a second opposite direction through lights 85 and 89 when the phase of the ac source provides a potential below ground potential. The wire 19*b* is coupled to sectors 33 thru 35 of commutator ring 29 at one end thereof and is connected to the south and west indicator lights 83 and 85 at the opposite end thereof. The wire 19*c* is coupled to sectors 37 thru 39 of commutator ring 29 at one end thereof and is connected to the north and east indicator lights 87 and 89 at the opposite end thereof.

As the assembly 30 is rotated in a clockwise direction, for example, in response to drive motor 21 via linkage 21*c*, the lights 83, 85, 87 and 89 are illuminated as illustrated in FIGS. 1 through 9. Beginning, for example, with the assembly 30 positioned as shown in FIG. 1, the antenna is generally pointing to the south and the assembly 30 is slightly west of the south counterclockwise end stop. Contactor 49 in FIG. 1 is positioned on conductive sector 34. With contactor 48 on ground member 27, current flows via lead 19*b* through diodes 43 and 80 and light 83 on alternate half cycles illuminating light 83. Note diodes 43 and 80 are poled in the same direction. With contactor 47 on insulative sector 40 and contactors 45 and 51 off the conductive strips 29*c* and 27 only the south light 83 is illuminated.

Figure 2:
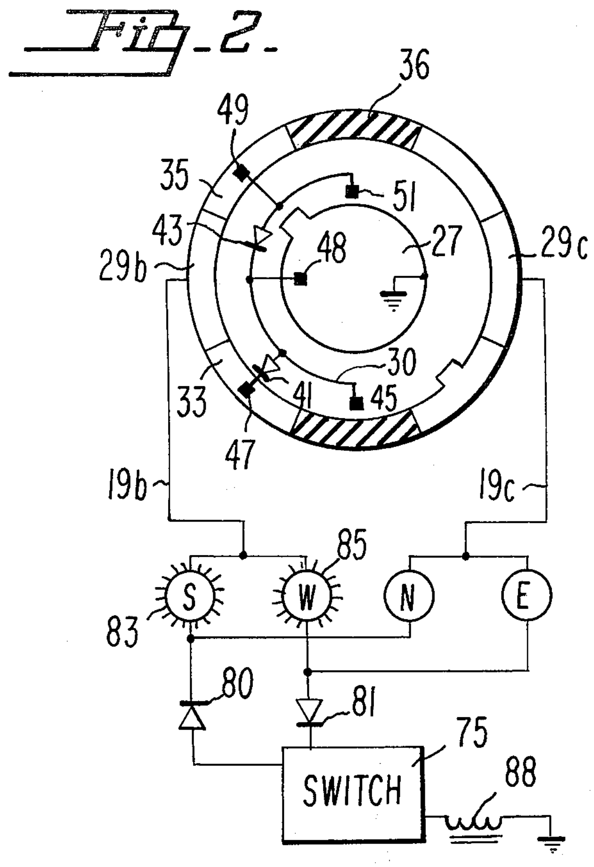
FIG. 2 is a schematic diagram of the direction indicator system when the antenna rotator is in the southwest antenna position.

When the antenna and the assembly 30 are rotated clockwise by the drive motor 21 to the position of FIG. 2, contactor 47 touches conductive sector 33 and contactor 49 touches conductive sector 35. The south indicator light 83 remains illuminated due to current through diodes 43 and 80 and contactors 49 and 48. Also, the west indicator light 85 is illuminated, due to current through like poled diodes 41 and 81, contactors 48 and 47 and wire 19*c* on alternate half cycles.

Figure 3:
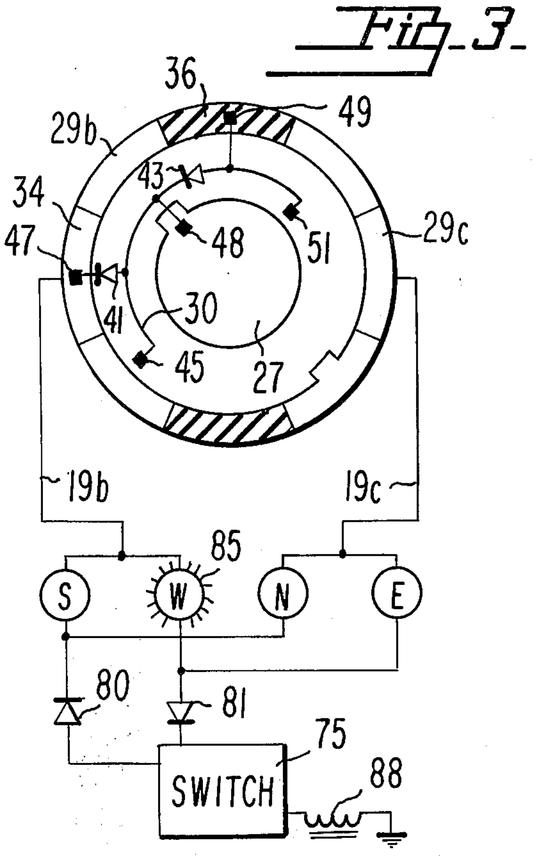
FIG. 3 is a schematic diagram of the direction indicator system when the antenna rotator is in the west antenna position.
Figure 4:
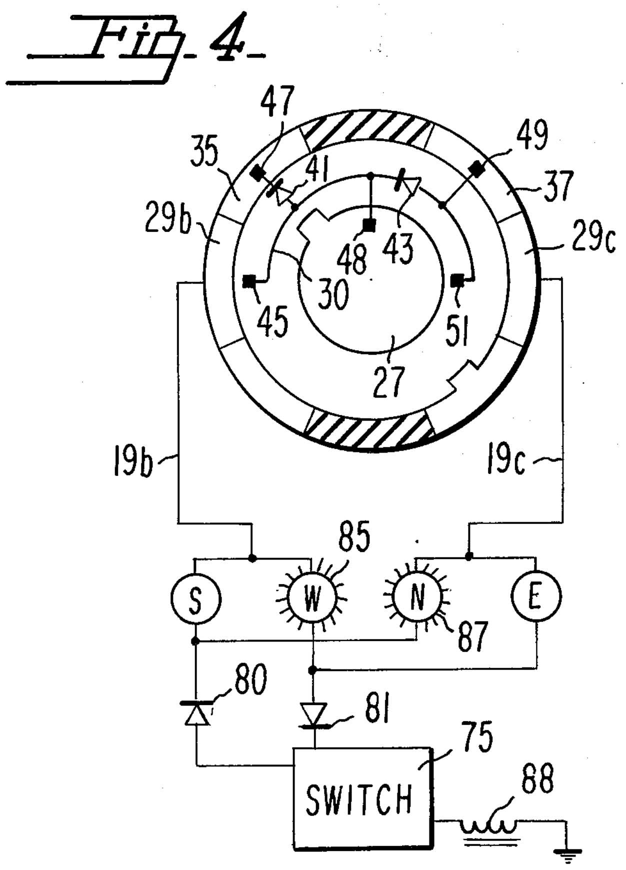
FIG. 4 is a schematic diagram of the direction indicator system when the antenna rotator is in the northwest antenna position.
Figure 5:
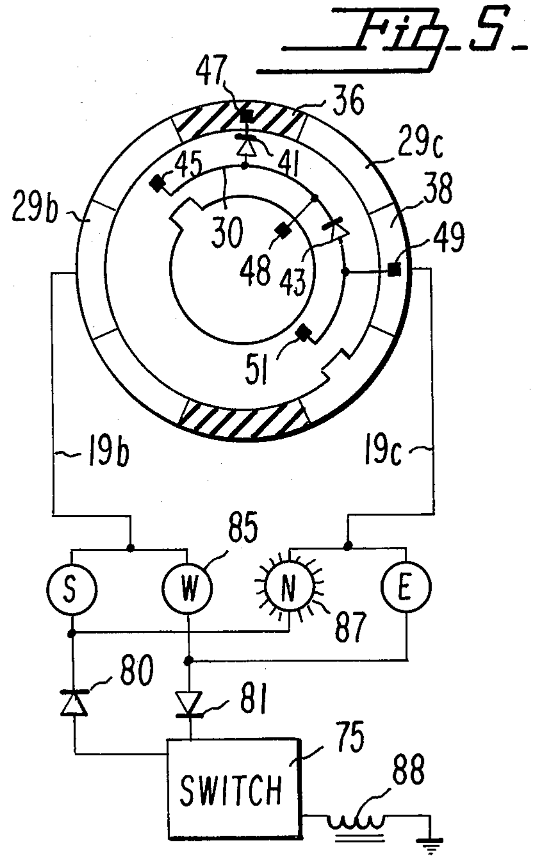
FIG. 5 is a schematic diagram of the direction indicator system when the antenna rotator is in the north antenna position.

When the antenna 11 and the assembly 30 are rotated clockwise by the drive motor 21 to the position of FIG. 3, only the west indicator light 85 remains illuminated. Current only flows through diodes 41 and 81 and contactors 48 and 47. The south light 83 is extinguished since the contactor 49 touches insulating sector 36. When the antenna 11 and the assembly 30 are rotated clockwise by the drive motor 21 to the position of FIG. 4, both the north and the west lights 85 and 87 are illuminated. The west indicator light 85 is illuminated due to current flow via diodes 41 and 81 and contactors 47 and 48. The north indicator light 87 is illuminated with current through diodes 43 and 80, contactors 48 and 49 and conductive sector 37. When the antenna 11 and the assembly 30 are rotated further clockwise by the drive motor 21 to the position of FIG. 5, end contacts 45 and 51 of assembly 30 are not connected to any of the conductive strips while contactor 48 is connected to member 27 and contactor 49 is connected to sector 38. Since in the position illustrated in FIG. 5, contactor 47 is at insulative sector 36, no current flows through diode 41 and contactor 47 and the west light 85 is extinguished. Current can only flow via conductive sector 38, wire 19*c*, contactors 48 and 49 in the direction of diode 43. Note diodes 43 and 80 are poled in the same direction. Since only diode 80 in the control unit 17 and diode 43 in the commutator assembly permit currrent flow in the same direction, only the north indicating light 87 is illuminated.

Figure 6:
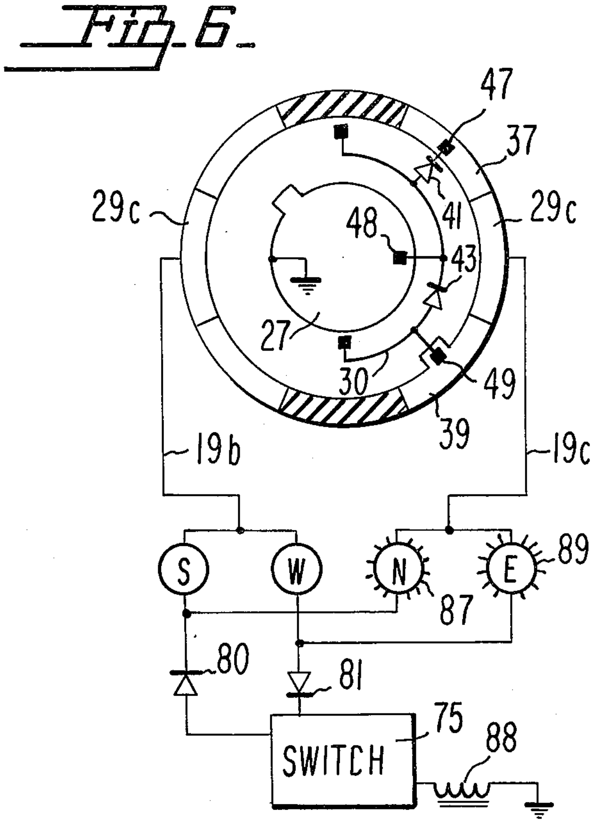
FIG. 6 is a schematic diagram of the direction indicator system when the antenna rotator is in the northeast antenna position.

Once the assembly 30 is rotated clockwise into the position of FIG. 6, by drive motor 21 via linkage 21*c* in synchronization with the rotation of antenna 11, the north indicating light 87 remains illuminated due to current flow through contactors 48 and 49, diodes 43 and 80 and conductive sector 39. In addition, the east indicating light 89 is illuminated due to current flow through contacts 48 and 47, diodes 41 and 81, wires 19*c* and 68*a* and conductive sector 37. Current for the east pointing light 89 is traveling in the opposite direction with respect to current through light 87. Both currents are traveling along wire 19*c* on alternate halves of the 60 cycle ac from the transformer 88.

Figure 7:
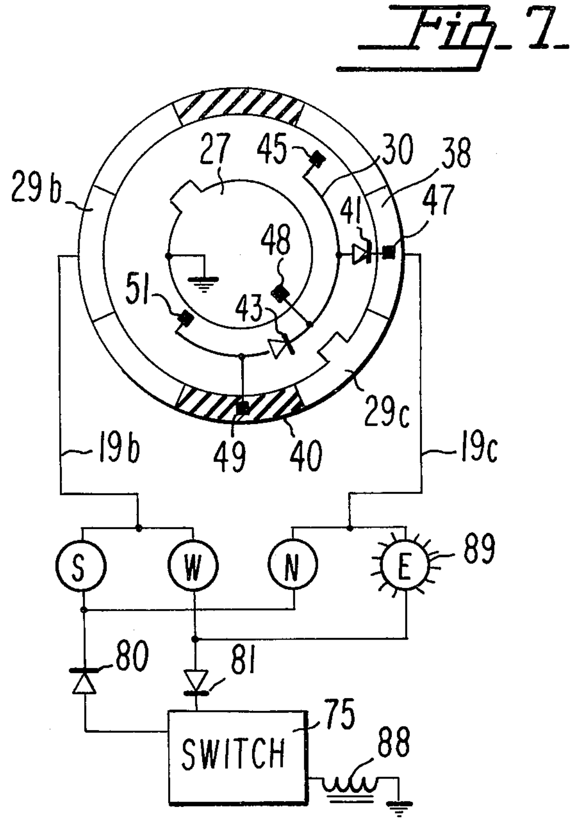
FIG. 7 is a schematic diagram of the direction indicator system when the antenna rotator is in the east antenna position.
Figure 8:
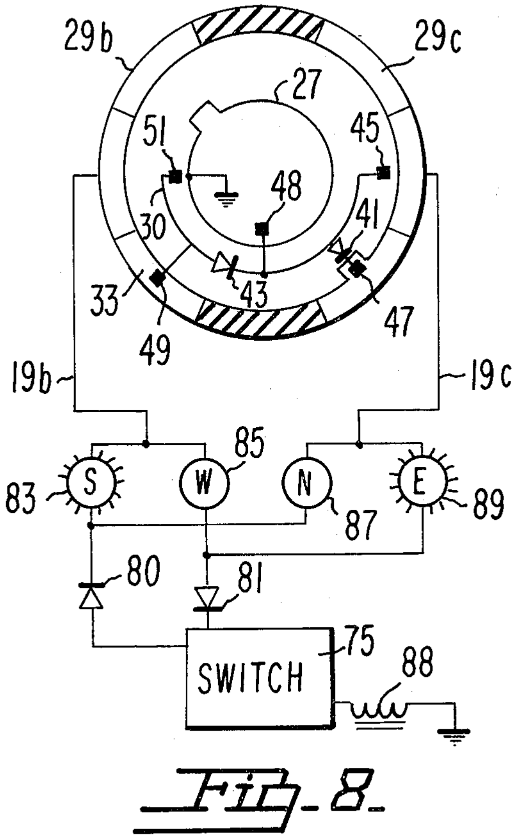
FIG. 8 is a schemtic diagram of the direction indicator system when the antenna rotator is in the southeast antenna position.

When the antenna 11 and assembly 30 are rotated again clockwise by drive motor 21 to the position of FIG. 7, current flows only through contactors 47 and 48 and similarly polarized diodes 41 and 81, thus illuminating only east light 89. Contactor 49 is on insulative sector 40. When the antenna 11 and assembly 30 are rotated further clockwise by drive motor 21 to the position of FIG. 8, contactor 49 makes contact with conductive sector 33 and contactor 47 makes contact with conductive sector 39. The east light is illuminated due to current through diode 41 and diode 81, contactors 47 and 48 and wire 19*c*. The south light is illuminated due to current through diodes 43 and 80, contactors 48 and 49 and wire 19*b*. When the antenna 11 and assembly 30 are rotated clockwise to the clockwise end-stop position of FIG. 9, all of the indicating lights 83, 85, 87 and 89 are illuminated. When the assembly 30 is in the position of FIG. 9, as a result of rotating the antenna 11 in the maximum clockwise or counterclockwise direction, contactor 51 makes contact with extended portion 27*a* of member 27 and contactor member 45 touches the extended portion 29*a* of commutator ring 29. In this position, the north light is being illuminated due to current flow through diode 80, contactor 45 and contactor 48, the east light 89 is being illuminated due to current through contactors 48 and 45 and diode 81, the south light is being illuminated due to current through diode 80, and contactors 49 and 51, and the west indicator light is being illuminated due to current through diode 81 and contactors 49 and 51. When operating the system in the counterclockwise direction, the description is as stated above but of course in a reverse order.

Figure 9:
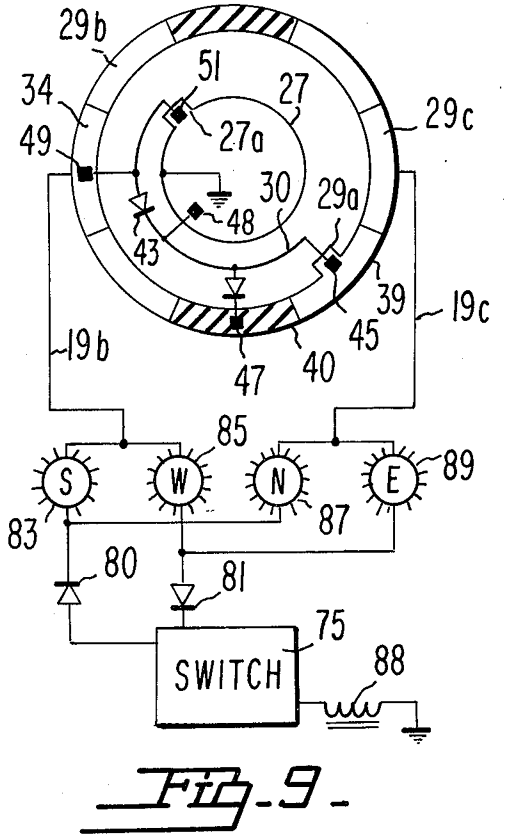
FIG. 9 is a schematic diagram of the direction indicator system when the antenna rotator is in the south end-stop position.

It can be seen by the above that, in addition to the four major compass positions, an indication of the intermediate positions of northeast, southeast, southwest and northwest are also provided. These intermediate compass positions are indicated by illumination of two lights. An indication of an end-stop position of the rotator is provided by illumination of all the lights 83, 85, 87 and 89 as shown in FIG. 9.

What is claimed is:

1. In an antenna rotator system including a remotely located drive means for rotating an antenna in azimuth and a local control means for controlling the rotated position of the antenna, an indicator system in combination therewith comprising:

at least one pair of conductive strips with said strips arranged in a circle with an insulating gap separating the strips at both opposite ends thereof, at least four indicator lights with each light having a pair of terminals and when a given one of said lights is illuminated indicating said antenna oriented in azimuth in one of the four major compass directions of north, south, east or west, a selected first and second of said indicator lights indicating consecutive major compass bearings each having one of its terminals coupled to the first of said pair of conductive strips, a selected third and fourth of said indicator lights indicating a different pair of consecutive major compass bearings each having one of its terminals coupled to the second of said pair of conductive strips, means connectable to a source of alternating current for applying current in only one direction to the second terminal of said first and said third lights where said first and third lights when illuminated indicate opposite compass directions, means connectable to said source of alternating current for applying current only in a second direction opposite said one direction to the second terminal of said second and fourth indicator lights, at least two rotatable contactors with each arranged to when rotated follow said circle to provide contact of said contactors on either of said two conductive strips or the insulating gaps therebetween, said two contactors being arranged to contact said conductive strips at points located about 90° of arc from each other, a first rectifying means coupled between a point of reference potential and a first of said two rotatable contactors to permit current conduction in only said one direction and a second rectifying means coupled between said point of reference potential and the second of said two rotatable contactors to permit current conduction in only said second direction, and means coupled to said drive means for rotating said contactors relative to said conductive strips so that when said first contactor touches said first conductive strip said first light is illuminated, when said first contactor touches said second strip said third indicator light is illuminated, when said second contactor touches said first strip said second light is illuminated, and when said second contactor touches said second strip said fourth indicator light is illuminated.

2. The combination claimed in claim 1 wherein two of said strips are 135° of arc long along the circumference of said circle.

3. The combination claimed in claim 1 wherein said means for coupling said first and second rectifying means between said first contactor and second contactor respectively and said point of reference potential includes an inner conductive member centered within said circle and isolated from said conductive strips and a third contactor always touching said inner conductive member and coupled to said first and second rectifiers.

4. The combination claimed in claim 1 including means for in response to a given location of said drive means illuminating all of said lights.

5. The combination claimed in claim 4 wherein said last mentioned means includes a fourth and a fifth contactor coupled to said first, second and third contactors and an enlarged portion of said inner conductive member and an enlarged portion of one of said first and second conductive strips.

6. A direction indicating display for use with a rotating drive means comprising:

at least four indicator lights each having a pair of terminals, a point of reference potential means connected with a terminal of each of said lights for permitting current from a source of alternating current to be applied in only a first direction through said first and third lights and to be applied in only a second reverse direction through said second and fourth lights, switch means including a first switch terminal coupled to a terminal of said first and second lights, a second switch terminal coupled to a terminal of said third and fourth lights, and a pair of unidirectional current conducting contactor elements with the first of said contactor elements adapted to pass current in said first direction when connected between one of said switch terminals and said point of reference potential and the second of said contactor elements adapted to pass current in said second direction when connected between one of said switch terminals and said point of reference potential, said contactor elements being disposed relative to each other and to said first and second switch terminals and responsive to the rotation of said drive means for, when said drive means is rotated to a first position, said first switch terminal is contacted by said first contactor element and said first light is illuminated, when said drive means is rotated to a second position, said first switch terminal is contacted by said second contactor element and said second light is illuminated; when said drive means is rotated to a third position, said second switch terminal is contacted by said first contactor element and said third light is illuminated; and, when said drive means is rotated to a fourth position, said second switch terminal is contacted by said second contactor element and said fourth light is illuminated.

7. A direction indicating display for use with a rotating drive means comprising in combination:

a plurality of conductive strips with insulating gaps separating said strips, first and second movable contactors connectable to a point of reference potential and adapted when moved to make electrical contact with said strips and gaps between said strips, said first movable contactor adapted to pass current in only a first direction and said second movable contactor adapted to pass current in only a second direction, the reverse of said first direction, at least four indicator lights each having a pair of terminals with a first and second of said lights coupled at a first terminal thereof to a first of said strips and with a third and fourth of said lights coupled at a first terminal thereof to a second of said strips, means connected with the second terminal of each of said lights for permitting current from a source of alternating current to be applied only in said first direction through said first and third lights and to be applied only in said second reverse direction through said second and fourth indicator lights, means coupled to said contactors and responsive to the rotation of said drive means for moving said contactors in synchronization with said drive means causing when said first strip is contacted by said first contactor illumination of said first light; when said first strip is contacted by said second contactor illumination of said second light; when said second strip is contacted by said first contactor illumination of said third light; and when said second strip is contacted by said second contactor illumination of said fourth light.

* * * * *